(12) United States Patent
Ando et al.

(10) Patent No.: US 8,229,653 B2
(45) Date of Patent: Jul. 24, 2012

(54) POWER OUTPUT APPARATUS, CONTROL METHOD THEREOF, AND VEHICLE

(75) Inventors: Daigo Ando, Nagoya (JP); Takeshi Harada, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 603 days.

(21) Appl. No.: 12/486,430

(22) Filed: Jun. 17, 2009

(65) Prior Publication Data

US 2009/0319158 A1    Dec. 24, 2009

(30) Foreign Application Priority Data

Jun. 18, 2008  (JP) ................................. 2008-159366

(51) Int. Cl.
*F02D 41/16* (2006.01)
*G06F 19/00* (2011.01)
*G06F 7/00* (2006.01)
*B60W 10/04* (2006.01)
*F02D 45/00* (2006.01)

(52) U.S. Cl. ................. 701/106; 123/339.14; 180/65.28

(58) Field of Classification Search ................... 701/106, 701/101, 102, 54, 22; 180/65.28, 65.265; 123/339.14, 339.23

See application file for complete search history.

(56) References Cited

U.S. PATENT DOCUMENTS

| 6,520,142 B2 * | 2/2003 | Nogi et al. ................... 123/300 |
| 7,255,662 B2 * | 8/2007 | Hiroe et al. ....................... 477/3 |
| 7,657,362 B2 * | 2/2010 | Ando et al. ................... 701/106 |
| 7,946,951 B2 * | 5/2011 | Kimura et al. ............. 180/65.28 |
| 2009/0319109 A1 * | 12/2009 | Ando et al. ....................... 701/22 |

FOREIGN PATENT DOCUMENTS

| JP | 6093911 | 4/1994 |
| JP | 2005325794 | 11/2005 |
| JP | 2007-196889 A | 8/2007 |

OTHER PUBLICATIONS

Japanese Office Action dated Jul. 19, 2011.

* cited by examiner

*Primary Examiner* — Hieu T Vo
(74) *Attorney, Agent, or Firm* — Gifford, Krass, Sprinkle, Anderson & Citkowski, P.C.

(57) ABSTRACT

A power output apparatus for outputting power to a drive shaft includes a control unit that controls an internal combustion engine to perform an idle operation at a predetermined rotation speed, executes idle control amount learning, in which an idle control amount serving as a control amount obtained during the control is learned in accordance with establishment of a predetermined learning condition, within a range in which a rotation speed of the drive shaft is lower than a first speed, when the idle control amount learning is incomplete, and executes again the idle control amount learning within a range in which the rotation speed of the drive shaft is lower than a second speed, which is lower than the first speed, when the idle control amount learning is complete.

14 Claims, 4 Drawing Sheets

POWER OUTPUT APPARATUS, CONTROL METHOD THEREOF, AND VEHICLE

INCORPORATION BY REFERENCE

The disclosure of Japanese Patent Application No. 2008-159366, filed on Jun. 18, 2008 including the specification, drawings and abstract, is incorporated herein by reference in its entirety.

BACKGROUND OF THE INVENTION

1. Field of the Invention

The invention relates to a power output apparatus, a control method thereof, and a vehicle equipped with the power output apparatus.

2. Description of the Related Art

Japanese Patent Application Publication No. 6-93911 (JP-A-6-93911), for example, discloses a power output apparatus that is installed in a vehicle and executes Idle Speed Control (ISC) learning processing for holding an idle rotation speed of an internal combustion engine at a target rotation speed during throttle valve opening/closing control, which is performed using a value obtained by correcting a detection value from a throttle opening sensor in accordance with a valve opening correction value relating to a throttle valve provided in an internal combustion engine after the valve opening correction value has been updated under a condition such as a vehicle speed value of 0. This processing is performed in the apparatus in an attempt to obtain an appropriate learning rate.

In a power output apparatus having an electric motor connected to a drive shaft, in which the drive shaft, an output shaft of an engine, and a rotary shaft of a generator are connected by a planetary gear mechanism or the like, a control amount such as a throttle opening during an idle operation of the engine is learned when power is not output to the drive shaft, but in order to secure more learning opportunities, learning may also be performed when power is output to the drive shaft from the electric motor alone. When a rotation speed of the drive shaft increases, however, the control amount during the idle operation may be learned erroneously due to the effect of the increased rotation speed on the output shaft of the engine.

SUMMARY OF THE INVENTION

The invention provides a power output apparatus, a control method thereof, and a vehicle, with which a control amount during an idle operation of an internal combustion engine can be learned more appropriately.

A first aspect of the invention relates to a power output apparatus for outputting power to a drive shaft. The power output apparatus includes: an internal combustion engine; an electric motor for inputting and outputting power; a triaxial power input/output unit that is mechanically connected to three shafts, including the drive shaft, an output shaft of the internal combustion engine, and a rotary shaft of the electric motor, in order to output power input into any two of the three shafts into a remaining shaft of the three shafts and output power input into any one of the three shafts into two remaining shafts of the three shafts, a chargeable/dischargeable storage unit that exchanges power with the electric motor and the generator, and a control unit that controls the internal combustion engine to perform an idle operation at a predetermined rotation speed, executes idle control amount learning, in which an idle control amount serving as a control amount obtained during the control is learned in accordance with establishment of a predetermined learning condition, within a range in which a rotation speed of the drive shaft is lower than a first speed, when the idle control amount learning is incomplete, and executes again the idle control amount learning within a range in which the rotation speed of the drive shaft is lower than a second speed, which is lower than the first speed, when the idle control amount learning is complete.

According to the above constitution, when learning of the idle control amount is incomplete, the idle control amount can be learned while the drive shaft rotates within a range below the first speed. Furthermore, according to the above constitution, when learning of the idle control amount is complete, the number of opportunities for learning the idle control amount while the drive shaft is in a rotationally stopped condition and the number of opportunities for learning the idle control amount in a condition where power generated by rotation variation in the drive shaft is not output to the output shaft of the internal combustion engine tend to increase in comparison with a case in which learning of the idle control amount is incomplete, and therefore erroneous learning of the idle control amount can be suppressed. As a result, the idle control amount can be learned more appropriately.

The power output apparatus according to this aspect may further include: a generator for inputting and outputting power to and from the drive shaft; and a required driving force setting unit for setting a required driving force, which is a driving force required by the drive shaft, and after executing learning of the idle control amount, the control unit may control the internal combustion engine, the generator, and the electric motor such that a driving force based on the set required driving force is output to the drive shaft.

In the power output apparatus according to this aspect, the predetermined learning condition may be established when a temperature of cooling water of the internal combustion engine equals or exceeds a predetermined temperature and an idle operation is underway in the internal combustion engine.

In the power output apparatus according to this aspect, the predetermined rotation speed may be between 900 rpm and 1000 rpm.

In the power output apparatus according to this aspect, the idle control amount may be an adjustment amount of a throttle opening of the internal combustion engine for causing the internal combustion engine to perform an idle operation at the predetermined rotation speed.

In the power output apparatus according to this aspect, the control unit may perform learning of the idle control amount repeatedly at predetermined time intervals.

A second aspect of the invention relates to a vehicle having a power output apparatus for outputting power to a drive shaft, and an axle connected to the drive shaft. The power output apparatus includes: an internal combustion engine; an electric motor for inputting and outputting power; a triaxial power input/output unit that is mechanically connected to three shafts, including the drive shaft, an output shaft of the internal combustion engine, and a rotary shaft of the electric motor, in order to output power input into any two of the three shafts into a remaining shaft of the three shafts and output power input into any one of the three shafts into two remaining shafts of the three shafts; and a control unit that controls the internal combustion engine to perform an idle operation at a predetermined rotation speed, executes idle control amount learning, in which an idle control amount serving as a control amount obtained during the control is learned in accordance with establishment of a predetermined learning condition, within a range in which a rotation speed of the drive shaft is lower than a first speed, when the idle control amount learning is incomplete, and executes again the idle control amount learning within a range in which the rotation speed of the drive shaft is lower than a second speed, which is lower than the first speed, when the idle control amount learning is complete.

According to the above constitution, when learning of the idle control amount is incomplete, the idle control amount can be learned while the drive shaft rotates within a range below the first speed, and when learning of the idle control amount is complete, erroneous learning of the idle control amount can be suppressed. As a result, the idle control amount can be learned more appropriately.

In the vehicle according to this aspect, the control unit may use a vehicle speed as the rotation speed of the drive shaft, may use a range below a first vehicle speed, including a vehicle traveling condition and a vehicle stopped condition, as the range in which the rotation speed of the drive shaft is lower than the first speed, and may use a range below a second vehicle speed, which is lower than the first vehicle speed and indicates a substantially stopped condition, as the range in which the rotation speed of the drive shaft is lower than the second speed. According to this constitution, the idle control amount can be learned even more appropriately.

A third aspect of the invention relates to a control method for a power output apparatus including an internal combustion engine, an electric motor for inputting and outputting power, a triaxial power input/output unit that is mechanically connected to three shafts, including the drive shaft, an output shaft of the internal combustion engine, and a rotary shaft of the electric motor, in order to output power input into any two of the three shafts into a remaining shaft of the three shafts and output power input into any one of the three shafts into two remaining shafts of the three shafts, a generator for inputting and outputting power, and a chargeable/dischargeable storage unit that exchanges power with the electric motor and the generator. The control method includes: controlling the internal combustion engine to perform an idle operation at a predetermined rotation speed; executing idle control amount learning, in which an idle control amount serving as a control amount obtained during the control is learned in accordance with establishment of a predetermined learning condition, within a range in which a rotation speed of the drive shaft is lower than a first speed, when the idle control amount learning is incomplete; and executing again the idle control amount learning within a range in which the rotation speed of the drive shaft is lower than a second speed, which is lower than the first speed, when the idle control amount learning is complete.

According to the above constitution, when learning of the idle control amount is incomplete, the idle control amount can be learned while the drive shaft rotates within a range below the first speed. Furthermore, according to the above constitution, when learning of the idle control amount is complete, the number of opportunities for learning the idle control amount while the drive shaft is in a rotationally stopped condition and the number of opportunities for learning the idle control amount in a condition where power generated by rotation variation in the drive shaft is not output to the output shaft of the internal combustion engine tend to increase in comparison with a case in which learning of the idle control amount is incomplete, and therefore erroneous learning of the idle control amount can be suppressed. As a result, the idle control amount can be learned more appropriately.

The control method according to this aspect may further include controlling the internal combustion engine, the generator, and the electric motor such that a driving force based on a required driving force, which is a driving force required by the drive shaft, is output to the drive shaft after learning of the idle control amount is executed.

In the control method according to this aspect, the predetermined learning condition may be established when a temperature of cooling water of the internal combustion engine equals or exceeds a predetermined temperature and an idle operation is underway in the internal combustion engine.

In the control method according to this aspect, the predetermined rotation speed may be between 900 rpm and 1000 rpm.

In the control method according to this aspect, the idle control amount may be an adjustment amount of a throttle opening of the internal combustion engine for causing the internal combustion engine to perform an idle operation at the predetermined rotation speed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
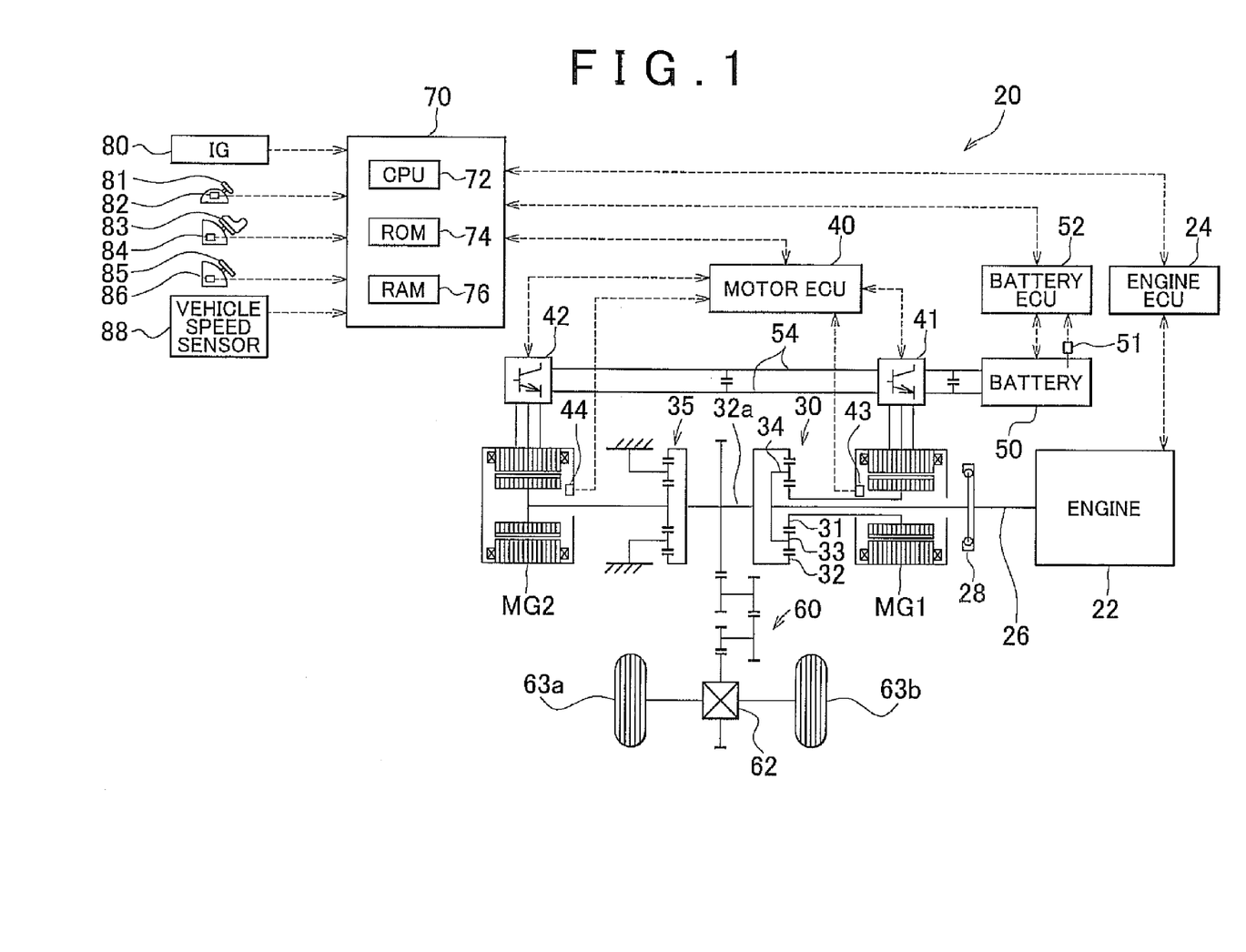
FIG. 1 is a schematic diagram showing the constitution of a hybrid automobile 20 serving as an embodiment of the invention.

Next, an embodiment of the invention will be described.
FIG. 1 is a schematic diagram showing the constitution of a hybrid automobile 20 installed with a power output apparatus according to an embodiment of the invention. As shown in the drawing, the hybrid automobile 20 according to this embodiment includes an engine 22, a triaxial power distribution integration mechanism 30 connected to a crankshaft 26, which serves as an output shaft of the engine 22, via a damper 28, a motor MG1 that is connected to the power distribution integration mechanism 30 and is capable of generating power, a reduction gear 35 attached to a ring gear shaft 32a serving as a drive shaft connected to the power distribution integration mechanism 30, a motor MG2 connected to the reduction gear 35, and a hybrid electronic control unit 70 (to be referred to hereafter as a hybrid ECU) for controlling the entire power output apparatus.

The engine 22 is an internal combustion engine that outputs power using a hydrocarbon-based fuel such as gasoline or light oil. An engine electronic control unit (to be referred to hereafter as an engine ECU) 24 inputs signals from various sensors for detecting operating conditions of the engine 22, and performs operation control, including fuel injection control, ignition control, intake air amount regulation control, and so on, on the engine 22. The signals from the various sensors include, for example, a cooling water temperature Tw from a water temperature sensor, not shown in the drawing, which detects the temperature of cooling water in the engine 22, a crank position from a crank position sensor, not shown in the drawing, which is attached to the crankshaft 26, and so on. When a predetermined learning condition is established, for example when the cooling water temperature Tw of the engine 22 has reached or exceeded a predetermined temperature (for example, 65° C., 70° C., or the like) indicating warm-up completion and an idle operation is underway in the engine 22, the engine ECU 24 feedback-controls a control amount such as a throttle opening such that a rotation speed Ne of the engine 22 corresponds to an idle rotation speed Nidl (for example, 900 rpm, 1000 rpm, or the like), and thereby learns a control amount for operating the engine 22 at the idle rotation speed Nidl. The resulting learned value is then stored for use during subsequent idle operation control of the engine 22. The engine ECU 24 also stores information indicating whether or not learning of the idle operation control amount (to be referred to hereafter as an idle control amount) is complete. Further, the engine ECU 24 communicates with the hybrid ECU 70 in order to control the operations of the engine 22 in accordance with a control signal from the hybrid ECU 70 and, when necessary, output data relating to the operating conditions of the engine 22 to the hybrid ECU 70. Note that the engine ECU 24 also calculates a rotation speed of the crankshaft 26, or in other words the rotation speed Ne of the engine 22, on the basis of a signal from the crank position sensor.

The power distribution integration mechanism 30 is a planetary gear mechanism including a sun gear 31 serving as an external gear, a ring gear 32 serving as an internal gear that is disposed concentrically with the sun gear 31, multiple pinion gears 33 that mesh with both the sun gear 31 and the ring gear 32, and a carrier 34 that holds the multiple pinion gears 33 to be free to rotate and revolve, which performs a differential action using the sun gear 31, the ring gear 32, and the carrier 34 as rotary elements. In the power distribution integration mechanism 30, the crankshaft 26 of the engine 22 is connected to the carrier 34, the motor MG1 is connected to the sun gear 31, and the reduction gear 35 is connected to the ring gear 32 via a ring gear shaft 32a. When functioning as a generator, the motor MG1 distributes power from the engine 22, which is input from the carrier 34, to the sun gear 31 side and the ring gear 32 side in accordance with a gear ratio thereof, and when functioning as an electric motor, the motor MG1 integrates the power of the engine 22 input from the carrier 34 and the power of the motor MG1, which is input from the sun gear 31, and outputs the integrated power to the ring gear 32 side. The power output to the ring gear 32 is ultimately output from the ring gear shaft 32a to drive wheels 63a, 63b of the vehicle via a gear mechanism 60 and a differential gear 62.

The motor MG1 and the motor MG2 are both well-known synchronous generator-motors that can be driven as both a generator and as an electric motor, and perform power exchange with a battery 50 via inverters 41, 42. A power line 54 connecting the inverters 41, 42 and the battery 50 serves as a positive electrode bus and a negative electrode bus shared by the inverters 41, 42 such that power generated by one of the motors MG1, MG2 can be consumed by the other. Accordingly, the battery 50 is charged using power generated in one of the motors MG1, MG2, and when a power deficiency occurs in the motors MG1, MG2, the motors MG1, MG2 extract power from the battery. Note that the battery 50 is neither charged nor discharged when an electric power balance is achieved by the motors MG1, MG2. The motors MG1, MG2 are both drive-controlled by a motor electronic control unit (to be referred to hereafter as a motor ECU) 40. The motor ECU 40 receives signals required to subject the motors MG1, MG2 to drive control, for example a signal from rotation position detection sensors 43, 44 that detect rotation positions of rotors in the motors MG1, MG2 and phase currents that are applied to the motors MG1, MG2 and detected by a current sensor, not shown in the drawing, and outputs a switching control signal to the inverters 41, 42. The motor ECU 40 communicates with the hybrid ECU 70 in order to drive-control the motors MG1, MG2 in accordance with a control signal from the hybrid ECU 70 and, when necessary, output data relating to the operating conditions of the motors MG1, MG2 to the hybrid ECU 70. Note that the motor ECU 40 also calculates rotation speeds Nm1, Nm2 of the motors MG1, MG2 on the basis of signals from the rotation position detection sensors 43, 44.

A battery electronic control unit (to be referred to hereafter as a battery ECU) 52 manages the battery 50. The battery ECU 52 receives signals required to manage the battery 50, for example an inter-terminal voltage obtained from a voltage sensor, not shown, disposed between terminals of the battery 50, a charge/discharge current obtained from a current sensor, not shown, attached to the power line 54, which is connected to an output terminal of the battery 50, a battery temperature Tb obtained from a temperature sensor 51 attached to the battery 50, and so on, and when necessary, outputs data relating to the condition of the battery 50 to the hybrid ECU 70 through communication. Further, to manage the battery 50, the battery ECU 52 calculates a remaining capacity (SOC; State of Charge) on the basis of an integrated value of the charge/discharge current detected by the current sensor, and calculates input/output limits Win, Wout, which serve as maximum allowable power values by which the battery 50 can be charged and discharged, on the basis of the calculated remaining capacity (SOC) and the battery temperature Tb. Note that the input/output limits Win, Wout of the battery 50 may be set by setting basic values of the input/output limits Win, Wout on the basis of the battery temperature Tb, setting an output limit correction coefficient and an input limit correction coefficient on the basis of the remaining capacity (SOC) of the battery 50, and multiplying the correction coefficients by the set basic values of the input/output limits Win, Wout.

The hybrid ECU 70 is a microprocessor centering on a Central Processing Unit (CPU) 72 and including, in addition to the CPU 72, a Read Only Memory (ROM) 74 for storing processing programs, a Random Access Memory (RAM) 76 for storing data temporarily, and an input/output port and a communication port, neither of which is shown in the drawing. The hybrid ECU 70 receives an ignition signal from an ignition switch 80, a shift position SP from a shift position sensor 82 for detecting an operating position of a shift lever 81, an accelerator depression amount Acc from an accelerator pedal position sensor 84 for detecting a depression amount of an accelerator pedal 83, a brake pedal position BP from a brake pedal position sensor 86 for detecting a depression amount of a brake pedal 85, a vehicle speed V from a vehicle speed sensor 88, and so on via the input port. As described above, the hybrid ECU 70 is connected to the engine ECU 24, the motor ECU 40, and the battery ECU 52 via the communication port in order to exchange various control signals and data with the engine ECU 24, the motor ECU 40, and the battery ECU 52.

The hybrid automobile 20 according to this embodiment, constituted in the manner described above, calculates a required torque to be output to the ring gear shaft 32a on the basis of the accelerator depression amount Acc and the vehicle speed V corresponding to the amount by which the accelerator pedal 83 is depressed by a driver, and subjects the engine 22, the motor MG1, and the motor MG2 to operation control such that a required power corresponding to the required torque is output to the ring gear shaft 32a. The operation control performed on the engine 22, the motor MG1, and the motor MG2 includes a torque conversion operating mode, a charge/discharge operating mode, a motor operating mode, and so on. In the torque conversion operating mode, the engine 22 is operation-controlled such that the required power is output, and the motors MG1, MG2 are drive-controlled such that all of the power output from the engine 22 is subjected to torque conversion by the power distribution integration mechanism 30 and the motors MG1, MG2 and then output to the ring gear shaft 32a. In the charge/discharge operating mode, the engine 22 is operation-controlled such that power corresponding to a sum of the required power and power required to charge/discharge the battery 50 is output, and the motors MG1, MG2 are drive-controlled such that all or a part of the power output from the engine 22 during charging/discharging of the battery 50 is subjected to torque conversion by the power distribution integration mechanism 30 and the motors MG1, MG2 and the required power is output to the ring gear shaft 32a. In the motor operating mode, the engine 22 is stopped or caused to perform an idle operation, and the motors MG1, MG2 are operation-controlled such that the required power is output to the ring gear shaft 32a from the motor MG2. Here, there is substantially no difference between the control performed in the torque conversion operating mode and the control performed in the charge/discharge operating mode except that in the former, charge/discharge of the battery 50 is not performed, and therefore, in the following description, the two modes will be described together as an engine operating mode.

Figure 2:
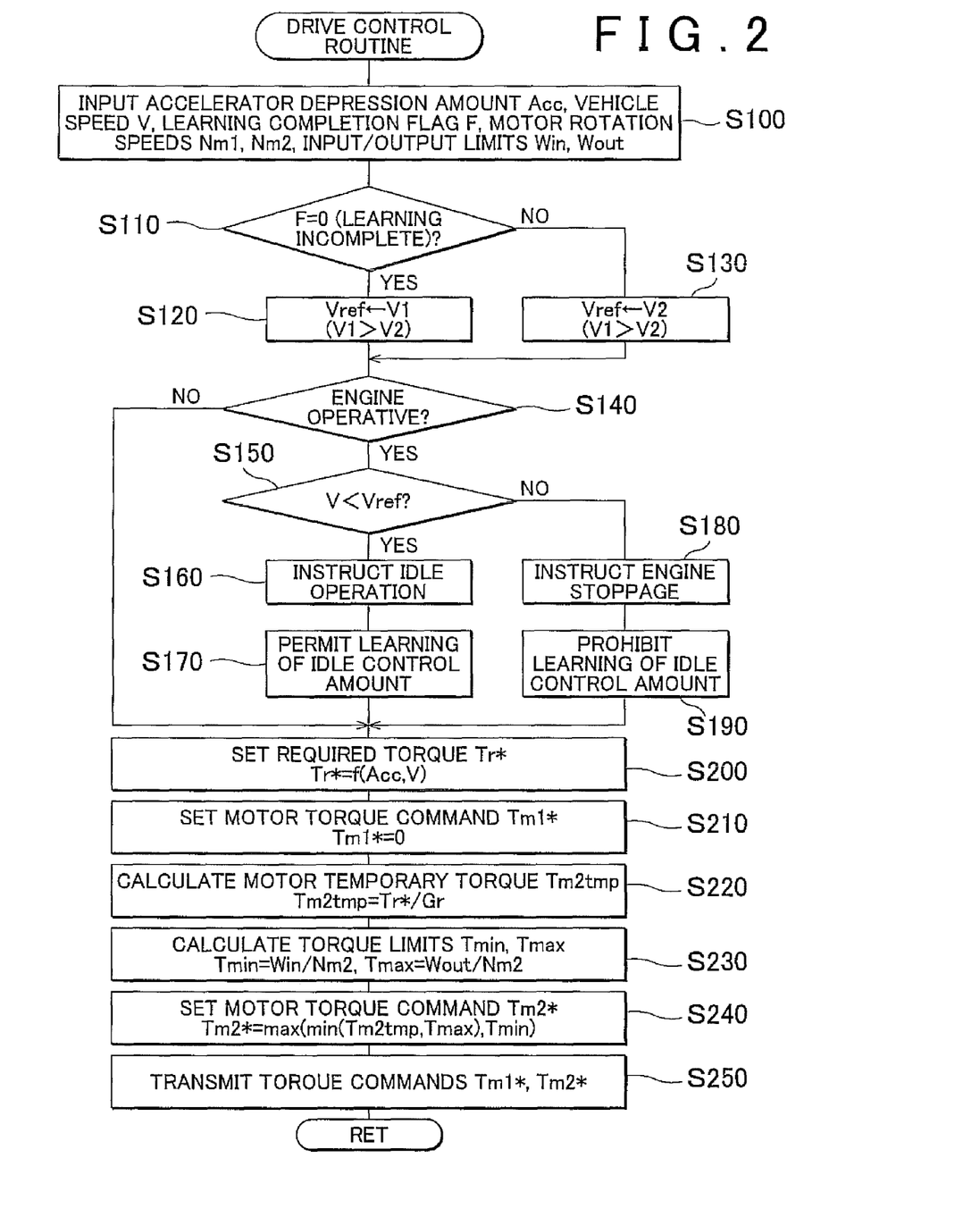
FIG. 2 is a flowchart showing an example of a drive control routine executed by a hybrid electronic control unit 70 according to the embodiment.

Next, an operation of the hybrid automobile 20 according to this embodiment, constituted in the manner described above, and particularly an operation performed when a predetermined learning condition (for example, a condition according to which the cooling water temperature Tw of the engine 22 has reached or exceeded the predetermined temperature indicating warm-up completion and an idle operation is underway in the engine 22, or the like) is established during a shift from the engine operating mode to the motor operating mode such that the hybrid automobile 20 travels while an idle control amount is learned, will be described. FIG. 2 is a flowchart showing an example of a drive control routine executed by the hybrid ECU 70. This routine is executed repeatedly at predetermined time intervals (of several msec, for example) when a condition for shifting from the engine operating mode to the motor operating mode is established. In this embodiment, a shift is performed from the engine operating mode to the motor operating mode when a condition according to which the power to be output from the engine 22 on the basis of the accelerator operation of the driver is smaller than a threshold and the remaining capacity (SOC) of the battery 50 is equal to or greater than a threshold is established, for example.

When the drive control routine is executed, first, the CPU 72 of the hybrid ECU 70 executes processing to input data required in the control, such as the accelerator depression amount Acc from the accelerator pedal position sensor 84, the vehicle speed V from the vehicle speed sensor 88, a learning completion flag F indicating whether or not learning of the idle control amount is complete, the rotation speeds Nm1, Nm2 of the motors MG1, MG2, and the input/output limits Win, Wout of the battery 50 (step S100). Here, the learning completion flag F is set at a value of 0 when learning of the idle control amount of the engine 22 has not been completed since the ignition was switched ON, and set at a value of 1 when the learning is completed for the first time and onward. The learning completion flag F is stored in a RAM, not shown in the drawing, of the engine ECU 24 and input into the CPU 72 of the hybrid ECU 70 from the engine ECU 24 through communication. Note that the hybrid ECU 70 receives the rotation speeds Nm1, Nm2 of the motors MG1, MG2, which are calculated on the basis of the rotation positions of the rotors of the motors MG1, MG2 detected by the rotation position detection sensors 43, 44, from the motor ECU 40 through communication. Further, the hybrid ECU 70 receives the input/output limits Win, Wout of the battery 50, which are set on the basis of the battery temperature Tb of the battery 50 and the remaining capacity (SOC) of the battery 50, from the battery ECU 52 through communication.

Once the data have been input in this manner, the input learning completion flag F is checked (step S110). When the learning completion flag F is at a value of 0, indicating that learning is incomplete, a positive value V1 is set as a threshold Vref to be compared with the vehicle speed V (step S120), and when the learning completion flag F is at a value of 1, indicating that learning is complete, a smaller positive value V2 than the value V1 is set as the threshold Vref1 (step S130). In this embodiment, the value V1 is a vehicle speed (for example, 50 km per hour, 60 km per hour, or the like) for determining that the vehicle is traveling within a range below a certain vehicle speed, and the value V2 is a vehicle speed (for example, 5 km per hour, 10 km per hour, or the like) for determining that the vehicle is substantially stationary. The reason for setting the threshold Vref at different values depending on whether or not learning is complete will be described below.

Next, a determination is made as to whether or not the engine 22 is operative (step S140), and when the engine 22 is operative, the input vehicle speed V is compared to the set threshold Vref (step S150). When the vehicle speed V is lower than the threshold Vref, a signal instructing that an idle operation be performed in the engine 22 and a signal permitting learning of the idle control amount are transmitted to the engine ECU 24 (steps S160, S170), and when the vehicle speed V equals or exceeds the threshold Vref, a signal instructing that the operation of the engine 22 be stopped and a signal prohibiting learning of the idle control amount are transmitted to the engine ECU 24 (steps S180, S190). After receiving the signal instructing that an idle operation be performed in the engine 22 and the signal permitting learning of the idle control amount, the engine ECU 24 causes the engine 22 to perform an idle operation, and when the predetermined learning condition is established, the engine ECU 24 executes idle control amount learning. After receiving the signal instructing that the operation of the engine 22 be stopped and the signal prohibiting learning of the idle control amount, the engine ECU 24 stops the operation of the engine 22 without executing idle control amount learning.

Figure 3:
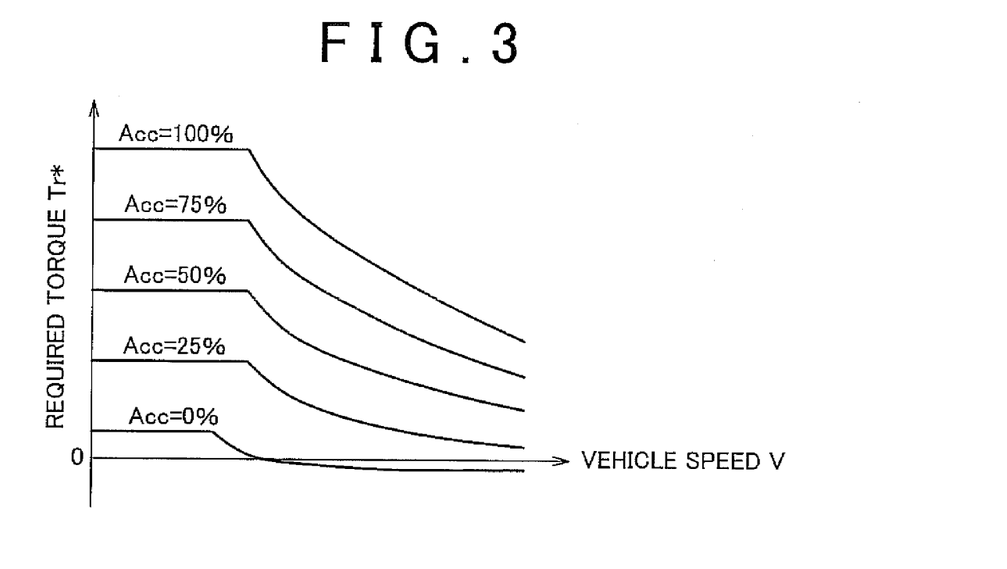
FIG. 3 is an illustrative view showing an example of a required torque setting map according to the embodiment.

When it is determined in step S140 that the operation of the engine 22 has been stopped or when the signal permitting or prohibiting learning of the idle control amount is transmitted to the engine ECU 24, a required torque Tr* to be output to the ring gear shaft 32a, which serves as the drive shaft connected to the drive wheels 63a, 63b, is set as a torque required by the vehicle on the basis of the input accelerator depression amount Acc and vehicle speed V (step S200). In this embodiment, the ROM 74 stores a required torque setting map in which a relationship between the accelerator depression amount Acc, the vehicle speed V, and the required torque Tr* is determined in advance. When the accelerator depression amount Acc and the vehicle speed V are provided, the corresponding required torque Tr* is calculated from the stored map, and thus the required torque Tr* is set. FIG. 3 shows an example of the required torque setting map.

The hybrid ECU 70 then sets a torque command Tm1* of the motor MG1 at a value of 0 (step S210), sets a value obtained by dividing the required torque Tr* by a gear ratio Gr of the reduction gear 35 as a temporary torque Tm2tmp, which is a temporarily value of the torque to be output from the motor MG2 (step S220), divides the input/output limits Win, Wout of the battery 50 by the rotation speed Nm2 of the motor MG2 to calculate torque limits Tmin, Tmax of the motor MG2 (step S230), limits the temporary torque Tm2tmp by the torque limits Tmin, Tmax to set a torque command Tm2* of the motor MG2 (step S240), and transmits the set torque commands Tm1*, Tm2* to the motor ECU 40 (step S250). The routine is then terminated. Upon reception of the torque commands Tm1*, Tm2*, the motor ECU 40 performs switching control on switching elements of the inverters 41, 42 such that the motor MG1 is driven by the torque command Tm1* and the motor MG2 is driven by the torque command Tm2*. According to this control, the required torque Tr* within the range of the input/output limits Win, Wout of the battery 50 is output to the ring gear shaft 32a from the motor MG2 in a state where the operation of the engine 22 is stopped or a state where an idle operation is underway in the engine 22 and learning of the idle control amount is executed, and thus the vehicle is caused to travel.

Figure 4:
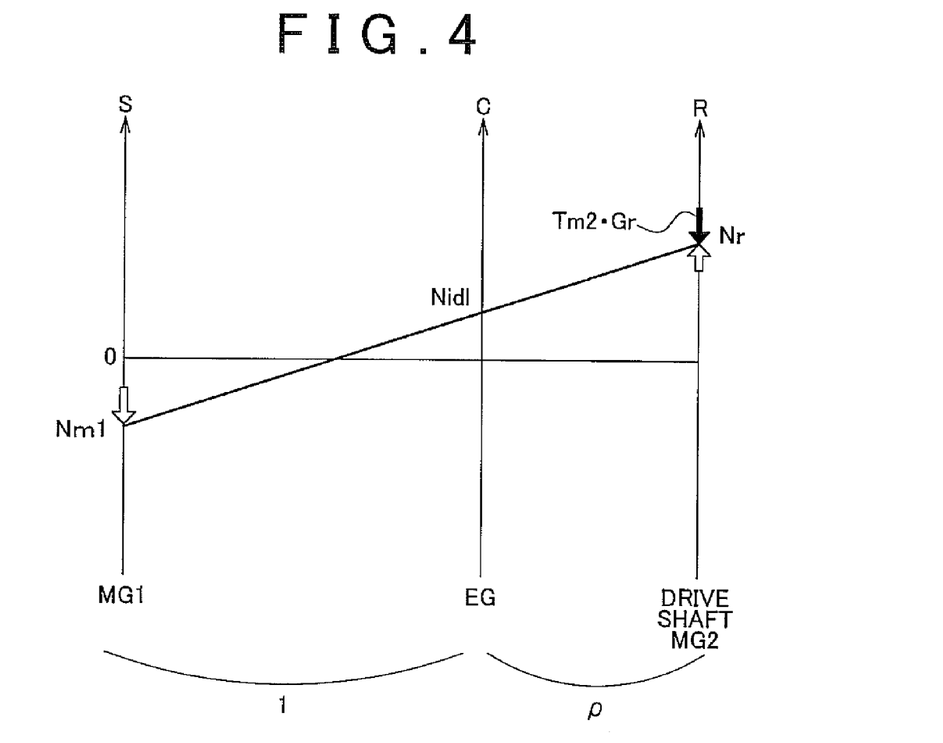
FIG. 4 is an illustrative view showing a collinear graph representing a dynamic relationship between a torque and a rotation speed of a rotary element of a power distribution integration mechanism 30 during travel in an accelerator OFF condition while an idle control amount is learned in a motor operation mode, according to the embodiment.

The reason for setting the threshold Vref at different values depending on whether or not idle control amount learning in the engine 22 is complete will now be described. When learning is incomplete, i.e. when learning of the idle control amount has not been completed since the ignition was turned ON, learning is preferably executed regardless of whether the vehicle is in a traveling condition or a stopped condition in order to secure a learning opportunity. When learning is complete, on the other hand, a problem may occur if learning is executed while the vehicle travels. FIG. 4 shows an example of a collinear graph illustrating a dynamic relationship between a torque and a rotation speed of a rotary element of the power distribution integration mechanism 30 during travel in an accelerator OFF state while learning of the idle control amount is performed in the engine 22 in the motor operation mode. An S axis on the left of the drawing indicates a rotation speed of the sun gear 31, i.e. the rotation speed Nm1 of the motor MG1. A C axis indicates a rotation speed of the carrier 34, i.e. the rotation speed Ne of the engine 22. An R axis indicates a rotation speed Nr of the ring gear 32, which is obtained by dividing the rotation speed Nm2 of the motor MG2 by the gear ratio Gr of the reduction gear 35. A thick arrow on the R axis indicates the torque Tm2 that is output from the motor MG2 and acts on the ring gear shaft 32a via the reduction gear 35. When the vehicle is in the traveling condition, the vehicle is accelerated and decelerated by an accelerator operation, a brake operation, and so on. For example, when the vehicle is decelerated by taking a foot off the accelerator, a torque corresponding to a product of an inertial moment on the sun gear 31 side of the power distribution integration mechanism 30 and a rotation variation amount of the sun gear 31 and a torque corresponding to a product of an inertial moment on the ring gear 32 side of the power distribution integration mechanism 30 and a rotation variation amount of the ring gear 32 act in a direction for inhibiting rotational variation in the sun gear 31 and ring gear 32, and also act on the crankshaft 26 of the engine 22 via the carrier 34, as shown by the outlined arrows on the S axis and the R axis. Hence, when the vehicle is in the traveling condition, the idle control amount is more likely to be learned erroneously than when the vehicle is in the stopped condition. Therefore, in the determination result of step S110, the comparatively large value V1 is set as the threshold Vref when learning is incomplete such that learning is performed to a certain extent in the stopped condition and also permitted in the traveling condition, whereby more learning opportunities are secured, and the value V2, which is considerably smaller than the value V1, is set as the threshold Vref when learning is complete such that learning is only permitted in a substantially stopped condition, thereby suppressing erroneous learning. By means of this control, idle control amount learning can be executed more appropriately.

According to the hybrid automobile 20 of the embodiment described above, the comparatively large value V1 is set as the threshold Vref when idle control amount learning in the engine 22 is incomplete such that learning is permitted in the traveling condition, and the value V2, which is considerably smaller than the value V1, is set as the threshold Vref when learning is complete such that learning is only permitted in a substantially stopped condition. Hence, idle control amount learning is executed in accordance with the establishment of the predetermined learning condition, i.e. the vehicle speed V being within a range below the threshold Vref, and therefore the idle control amount can be learned more appropriately.

In the hybrid automobile 20 according to this embodiment, a vehicle speed for determining a condition in which the vehicle travels within a range below a certain vehicle speed and a vehicle speed for determining a stopped condition are respectively employed as the values V1 and V2 set as the threshold Vref to be compared to the vehicle speed V. However, any values having a relationship whereby the value V2 is smaller than the value V1 may be used.

In the hybrid automobile 20 according to this embodiment, the determination as to whether to permit or prohibit learning of the idle control amount is made in accordance with the magnitude of the vehicle speed V obtained from the vehicle speed sensor 88, but the determination as to whether to permit or prohibit learning of the idle control amount may be made in accordance with the magnitude of the rotation speed Nm2 of the motor MG2 instead of the vehicle speed V obtained from the vehicle speed sensor 88.

In the hybrid automobile 20 according to this embodiment, control performed during a shift from the engine operating mode to the motor operating mode was described, but the invention may be applied to control performed in any state where an idle operation can be performed in the engine 22.

In the hybrid automobile 20 according to this embodiment, the motor MG2 is attached to the ring gear shaft 32a serving as the drive shaft via the reduction gear 35, but the motor MG2 may be attached to the ring gear shaft 32a directly or via a transmission having two speeds, three speeds, four speeds, or more instead of the reduction gear 35.

Figure 5:
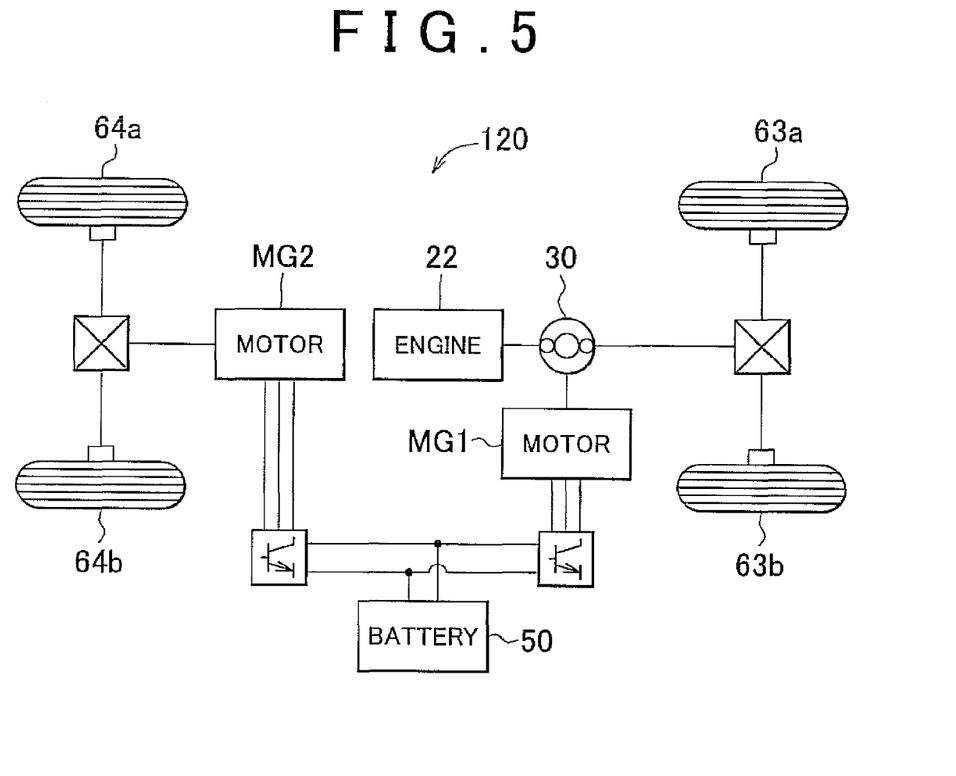
FIG. 5 is a schematic diagram showing the constitution of a hybrid automobile 120 according to a modified example of the embodiment.

In the hybrid automobile 20 according to this embodiment, the power of the motor MG2 is speed-shifted by the reduction gear 35 and then output to the ring gear shaft 32a. As shown in FIG. 5, which shows a hybrid automobile 120 according to a modified example, however, the power of the motor MG2 may be output to an axle (e.g., axle connected to vehicle wheels 64a, 64b in FIG. 5) other than the axle to which the ring gear shaft 32a is connected (i.e., the axle to which the drive wheels 63a, 63b are connected).

Furthermore, the invention is not limited to a hybrid automobile, and may be applied to a power output apparatus installed in a moving body such as a vehicle other than an automobile, a ship, or an aircraft, or a power output apparatus incorporated into an immobile facility such as a construction facility. The invention may also be applied to a control method for these types of power output apparatuses.

In this embodiment, the engine 22 is an example of an "internal combustion engine" of the invention, the motor MG1 is an example of an "electric motor" of the invention, the power distribution integration mechanism 30 is an example of a "triaxial power input/output unit" of the invention, the motor MG2 is an example of a "generator" of the invention, the battery 50 is an example of a "storage unit" of the invention, and the hybrid ECU 70 that executes the processing of step S200 in the drive control routine shown in FIG. 2, in which the required torque Tr* is set on the basis of the accelerator depression amount Acc and the vehicle speed V is an example of a "required driving force setting unit" of the invention. Further, the hybrid ECU 70 that executes the processing of steps S110 to S190 and S210 to S250 in the drive control routine shown in FIG. 2, in which the comparatively large value V1 is set as the threshold Vref when learning of the idle control amount is incomplete and the value V2, which is smaller than the value V1, is set as the threshold Vref when the learning is complete such that when the vehicle speed V is lower than the set threshold Vref, a signal is transmitted to the engine ECU 24 to have the engine 22 perform an idle operation such that idle control amount learning is executed in accordance with establishment of the predetermined learning condition, and when the vehicle speed V is equal to or higher than the set threshold Vref, a signal is transmitted to the ECU 24 to have the operation of the engine 22 stopped without executing idle control amount learning, and in which the zero value torque command Tm1* of the motor MG1 and the torque command Tm2* of the motor MG2 for outputting the required torque Tr* to the ring gear shaft 32a within the range of the input/output limits Win, Wout of the battery 50 are set and transmitted to the motor ECU 40, as well as the engine ECU 24 for controlling the engine 22 such that idle control amount learning is executed in accordance with establishment of the predetermined learning condition within the range permitted on the basis of the received signals and the motor ECU 40 for controlling the motors MG1, MG2 on the basis of the torque commands Tm1*, Tm2*, are examples of a "control unit" of the invention.

Here, the "internal combustion engine" is not limited to an internal combustion engine that outputs power using a hydrocarbon-based fuel such as gasoline or light oil, and may be any type of internal combustion engine, such as a hydrogen engine. The "electric motor" is not limited to the motor MG1, which is constituted by a synchronous generator motor, and may be any type of electric motor that inputs and outputs power, such as an induction motor. The "triaxial power input/output unit" is not limited to the power distribution integration mechanism 30 described above, and may be any device that is connected to three shafts, namely a drive shaft, an output shaft of an internal combustion engine, and a rotary shaft of an electric motor, so as to input and output power to one of the three shafts on the basis of power that is input to and output from the other two shafts, such as a device that employs a double pinion type planetary gear mechanism, a device that is connected to four or more shafts through a combination of multiple planetary gear mechanisms, or a device that exhibits a different differential action to a planetary gear, such as a differential gear. The "generator" is not limited to the motor MG2, which is constituted by a synchronous generator motor, and may be any type of electric motor that inputs and outputs power to and from a drive shaft, such as an induction motor. The "storage unit" is not limited to the battery 50 serving as a secondary battery, and may be any device that exchanges power with a generator and an electric motor, such as a capacitor. The "required driving force setting unit" is not limited to a device that sets the required torque Tr* on the basis of the accelerator depression amount Acc and the vehicle speed V, and may be any device that sets a required driving force required by a drive shaft, such as a device that sets the required torque on the basis of the accelerator depression amount Acc alone or a device in which a travel route is preset such that the required torque is set on the basis of a travel position on the travel route. The "control unit" is not limited to a combination of the hybrid ECU 70, the engine ECU 24, and the motor ECU 40, and may be constituted by a single electronic control unit. Further, the "control unit" is not limited to a device that sets the comparatively large value V1 as the threshold Vref when learning of the idle control amount is incomplete and sets the value V2, which is smaller than the value V1, as the threshold Vref when the learning is complete such that when the vehicle speed V is lower than the set threshold Vref, the engine 22 is controlled to perform an idle operation such that idle control amount learning is executed in accordance with establishment of the predetermined learning condition, and when the vehicle speed V is equal to or higher than the set threshold Vref, the engine 22 is controlled such that the operation of the engine 22 is stopped without executing idle control amount learning, and controls the motors MG1, MG2 on the basis of the torque command Tm1* of the motor MG1, which is set at a value of 0, and the torque command Tm2* of the motor MG2, which is set such that the required torque Tr* is output to the ring gear shaft 32a within the range of the input/output limits Win, Wout of the battery 50, and may be any device that controls an internal combustion engine, a generator, and an electric motor such that when idle control amount learning, in which an idle control amount serving as a control value obtained during an idle operation of the internal combustion engine is learned in accordance with the establishment of a predetermined learning condition, is incomplete, idle control amount learning is executed within a range in which the rotation speed of the drive shaft is lower than a first speed and a driving force based on a set required driving force is output to the drive shaft, and controls the internal combustion engine, the generator, and the electric motor such that when the idle control amount learning is complete, idle control amount learning is executed within a range in which the rotation speed of the drive shaft is lower than a second speed that is smaller than the first speed and the driving force based on the set required driving force is output to the drive shaft.

Furthermore, in the power detection apparatus according to the invention, a rotation speed detection unit may function as a vehicle speed detection unit for detecting the vehicle speed, and the control unit may perform control using a first vehicle speed as the first speed and a second vehicle speed as the second speed.

Note that the principle elements of the embodiment are not intended to limit elements of the invention, and the embodiment is merely a specific example of the invention.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention may be used in the power output apparatus and vehicle manufacturing industries, and so on.

What is claimed is:

1. A power output apparatus for outputting power to a drive shaft, comprising:
   an internal combustion engine;
   an electric motor for inputting and outputting power;
   a triaxial power input/output unit that is mechanically connected to three shafts, including the drive shaft, an output shaft of the internal combustion engine, and a rotary shaft of the electric motor, in order to output power input into any two of the three shafts into a remaining shaft of the three shafts and output power input into any one of the three shafts into two remaining shafts of the three shafts;
   a chargeable/dischargeable storage unit that exchanges power with the electric motor and the generator; and
   a control unit that controls the internal combustion engine to perform an idle operation at a predetermined rotation speed, executes idle control amount learning, in which an idle control amount serving as a control amount obtained during the control is learned in accordance with establishment of a predetermined learning condition, within a range in which a rotation speed of the drive shaft is lower than a first speed, when the idle control amount learning is incomplete, and executes again the idle control amount learning within a range in which the rotation speed of the drive shaft is lower than a second speed, which is lower than the first speed, when the idle control amount learning is complete.

2. The power output apparatus according to claim 1, further comprising:
   a generator for inputting and outputting power to and from the drive shaft; and
   a required driving force setting unit for setting a required driving force, which is a driving force required by the drive shaft,
   wherein, after executing learning of the idle control amount, the control unit controls the internal combustion engine, the generator, and the electric motor such that a driving force based on the set required driving force is output to the drive shaft.

3. The power output apparatus according to claim 1, wherein the predetermined learning condition is established when a temperature of cooling water of the internal combustion engine equals or exceeds a predetermined temperature and an idle operation is underway in the internal combustion engine.

4. The power output apparatus according to claim 1, wherein the predetermined rotation speed is between 900 rpm and 1000 rpm.

5. The power output apparatus according to claim 1, wherein the idle control amount is an adjustment amount of a throttle opening of the internal combustion engine for causing the internal combustion engine to perform an idle operation at the predetermined rotation speed.

6. The power output apparatus according to claim 1, wherein the control unit performs learning of the idle control amount repeatedly at predetermined time intervals.

7. A vehicle characterized by comprising:
   the power output apparatus according to claim 1; and
   an axle connected to the drive shaft.

8. The vehicle according to claim 7, wherein the control unit uses a vehicle speed as the rotation speed of the drive shaft, uses a range below a first vehicle speed, including a vehicle traveling condition and a vehicle stopped condition, as the range in which the rotation speed of the drive shaft is lower than the first speed, and uses a range below a second vehicle speed, which is lower than the first vehicle speed and indicates a substantially stopped condition, as the range in which the rotation speed of the drive shaft is lower than the second speed.

9. The vehicle according to claim 7, wherein:
   the power output apparatus comprises a generator for inputting and outputting power to and from the drive shaft, and a required driving force setting unit for setting a required driving force, which is a driving force required by the drive shaft;
   the control unit, after executing learning of the idle control amount, controls the internal combustion engine, the generator, and the electric motor such that a driving force based on the set required driving force is output to the drive shaft; and
   the required driving force is determined on the basis of an accelerator operation performed by a driver of the vehicle.

10. A control method for a power output apparatus including an internal combustion engine, an electric motor for inputting and outputting power, a triaxial power input/output unit that is mechanically connected to three shafts, including a drive shaft, an output shaft of the internal combustion engine, and a rotary shaft of the electric motor, in order to output power input into any two of the three shafts into a remaining shaft of the three shafts and output power input into any one of the three shafts into two remaining shafts of the three shafts, a generator for inputting and outputting power, and a chargeable/dischargeable storage unit that exchanges power with the electric motor and the generator, characterized by comprising:
    controlling the internal combustion engine to perform an idle operation at a predetermined rotation speed;
    executing idle control amount learning, in which an idle control amount serving as a control amount obtained during the control is learned in accordance with establishment of a predetermined learning condition, within a range in which a rotation speed of the drive shaft is lower than a first speed, when the idle control amount learning is incomplete; and
    executing again the idle control amount learning within a range in which the rotation speed of the drive shaft is lower than a second speed, which is lower than the first speed, when the idle control amount learning is complete.

11. The control method according to claim 10, further comprising controlling the internal combustion engine, the generator, and the electric motor such that a driving force based on a required driving force, which is a driving force required by the drive shaft, is output to the drive shaft after learning of the idle control amount is executed.

12. The control method according to claim 10, wherein the predetermined learning condition is established when a temperature of cooling water of the internal combustion engine equals or exceeds a predetermined temperature and an idle operation is underway in the internal combustion engine.

13. The control method according to claim 10, wherein the predetermined rotation speed is between 900 rpm and 1000 rpm.

14. The control method according to claim 10, wherein the idle control amount is an adjustment amount of a throttle opening of the internal combustion engine for causing the internal combustion engine to perform an idle operation at the predetermined rotation speed.

* * * * *